(12) United States Patent
Kartoun et al.

(10) Patent No.: US 11,165,788 B2
(45) Date of Patent: Nov. 2, 2021

(54) SCORE BASED PERMISSION SYSTEM

(71) Applicant: International Business Machines Corporation, Armonk, NY (US)

(72) Inventors: Uri Kartoun, Cambridge, MA (US); Morgan Anna Foreman, East Boston, MA (US); Aabhas Sharma, Cambridge, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 16/571,252

(22) Filed: Sep. 16, 2019

(65) Prior Publication Data

US 2021/0084049 A1 Mar. 18, 2021

(51) Int. Cl.
*H04L 29/06* (2006.01)

(52) U.S. Cl.
CPC .......... *H04L 63/105* (2013.01); *H04L 63/101* (2013.01); *H04L 63/102* (2013.01)

(58) Field of Classification Search
None
See application file for complete search history.

(56) References Cited

U.S. PATENT DOCUMENTS

| | | |
|---|---|---|
| 5,941,947 A | 8/1999 | Brown |
| 9,660,821 B2 | 5/2017 | Safa |
| 9,860,280 B1 | 1/2018 | Arquero |
| 2011/0016534 A1* | 1/2011 | Jakobsson ............... H04L 67/22 726/28 |
| 2013/0227712 A1* | 8/2013 | Salem ................. G06F 21/6218 726/30 |
| 2015/0381631 A1* | 12/2015 | Salem ................... H04L 63/102 726/4 |
| 2017/0163650 A1* | 6/2017 | Seigel ................... H04L 63/104 |
| 2018/0288063 A1* | 10/2018 | Koottayi ............... H04L 63/102 |
| 2019/0019363 A1* | 1/2019 | Zellner ............... H04L 63/1416 |
| 2020/0004936 A1* | 1/2020 | Avital ................... G06F 21/577 |
| 2020/0053090 A1* | 2/2020 | Kliger .................... H04L 63/10 |
| 2020/0236086 A1* | 7/2020 | Patil .................... H04L 63/1416 |
| 2020/0302074 A1* | 9/2020 | Little .................. G06F 21/6218 |

FOREIGN PATENT DOCUMENTS

| | | |
|---|---|---|
| CN | 109918924 A | 6/2019 |
| GN | 104780159 A | 7/2015 |

OTHER PUBLICATIONS

Alsulaiman et al., Threshold-based Collaborative Access Control (T-CAC), 2007 International Symposium on Collaborative Technologies and Systems, pp. 46-56, doi: 10.1109/CTS.2007.4621737.
(Continued)

*Primary Examiner* — Natisha D Cox
(74) *Attorney, Agent, or Firm* — Alexander G. Jochym

(57) ABSTRACT

One or more files are determined. Each file of the one or more files has a score threshold for access. One or more users are determined. Each user of the one or more users has a score for each file of the one or more files. An access request from a user of the one or more users is received. The request is for the user to access a file of the one or more files. The score for the file for the user is compared to the score threshold for access for the file.

20 Claims, 4 Drawing Sheets

(56) References Cited

OTHER PUBLICATIONS

Frikken et al., "Attribute-Based Access Control with Hidden Policies and Hidden Credentials", IEEE Transactions on Computers, vol. 55, No. 10, Oct. 2006, pp. 1259-1270, doi: 10.1109/TC.2006.158.

Rahmati et al., "Context-Specific Access Control: Conforming Permissions With User Expectations", Proceedings of the 5th Annual ACM CCS Workshop on Security and Privacy in Smartphones and Mobile Devices, SPSM'15, Oct. 12, 2015, Denver, CO, USA, pp. 75-80, doi:10.1145/2808117.2808121.

\* cited by examiner

SCORE BASED PERMISSION SYSTEM

BACKGROUND

The present invention relates generally to the field of data access, and more particularly to allowing data access based on a score system.

In data systems, access to the data is often controlled by either the administrator or the creator of the data. The data access controls can be modified or updated based on new users being allowed to access the data or users no longer being allowed to access the data. This can be done on a file level, folder level, directory level, etc. Often the originator or creator of the data is the one who controls a branch of data and can grant access to other users by inviting them to collaborate in a folder that includes a number of files or a specific file.

Standard approaches of strictly defining who can get access to a folder or files have several limitations. For example, if the user who formed the branch leaves a company then this may result in a permission inheritance issue that could prevent other users from accessing the folder or files. Additionally, access is granted generally to users initially even if they currently do not need to access the folder or file or in the future do not need to access the file or folder.

SUMMARY

Embodiments of the present invention include a method, computer program product, and system for data access. In one embodiment, one or more files are determined. Each file of the one or more files has a score threshold for access. One or more users are determined. Each user of the one or more users has a score for each file of the one or more files. A request from a user of the one or more users is received. The request is for the user to access a file of the one or more files. The score for the file for the user is compared to the score threshold for access for the file.

In one embodiment, responsive to the score for the file for the user exceeding the score threshold for access for the file, the request is granted. In one embodiment, responsive to the score threshold for access for the file exceeding the score for the file for the user, the request is denied. In an embodiment, a score of any of the one or more files is modified based on a score event.

DETAILED DESCRIPTION

File access, especially in the case of users trying to access files that they should not have access to is an increasing concern in data networks especially with the increase in data. For example, if the user who formed the branch leaves a company then this may result in a permission inheritance issues that could prevent other users from accessing the folder or files. Additionally, access is granted generally to users initially, even if they currently do not need to access the folder or file or in the future do not need to access the file or folder. Additionally, in the age of users trying to gain access to files they should not have access to (e.g., hackers) a need for further refinement of control over file access to files is needed.

Embodiments of the present invention provide for control of a file, folder of files, file types or grouping of files by a program to determine access to any of the files, folders, file types or file groupings using a score-based system. Embodiments of the present invention provide for the continual updating of a score for a user for a file based on the action/interaction of the user with the file or other files. In current art, accesses to files are granted initially or in large chunks to users. Embodiment of the present invention recognize that each access needs of a one or more users may change over time; a certain user, for example, may not need the same extent of access privileges in different points in time so his or her access may be restricted. Embodiments of the present invention describe a method for calculating an access eligibility score for each resource the individual user currently access or will access in the future. The approach is distinctive from standard approaches in which a certain manual security policy is applied.

Figure 1:
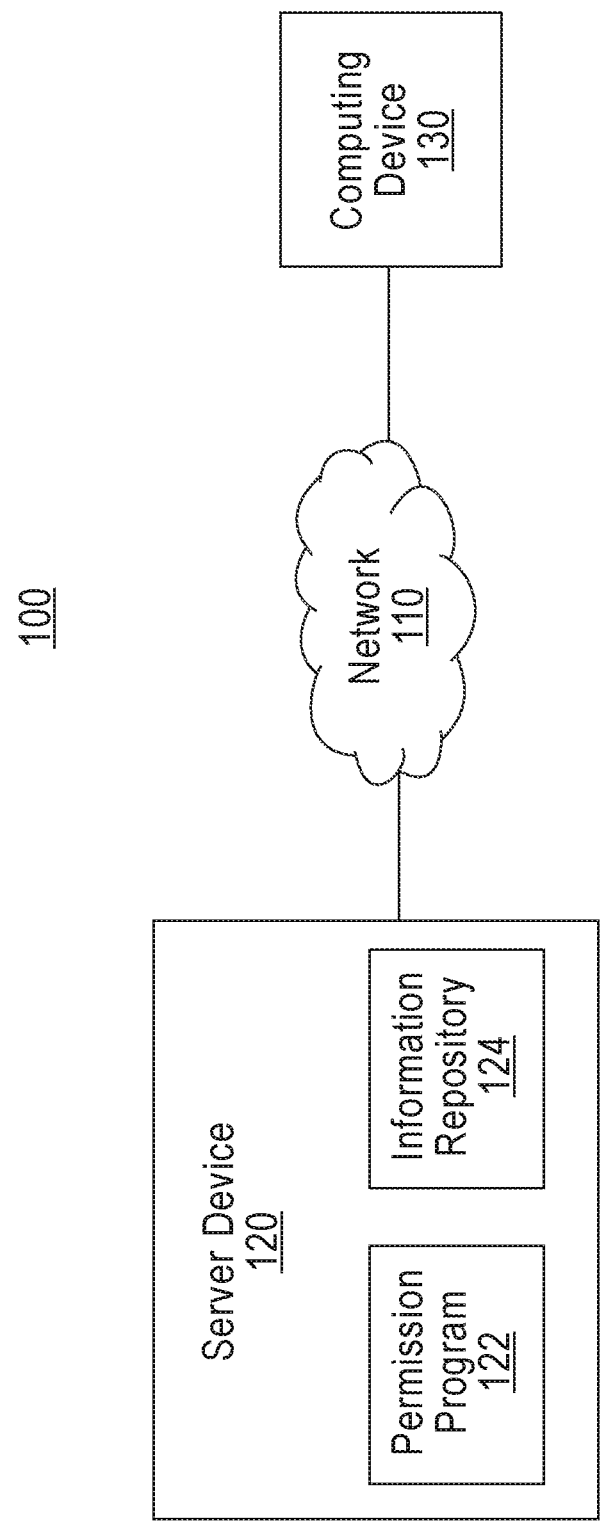
FIG. 1 is a functional block diagram of a network computing environment, generally designated 100, suitable for operation of permission program 122, in accordance with at least one embodiment of the invention.

Referring now to various embodiments of the invention in more detail, FIG. 1 is a functional block diagram of a network computing environment, generally designated 100, suitable for operation of permission program 122 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes server device 120 and computing device 130 interconnected over network 110. In embodiments of the present invention, network 110 can be a telecommunications network, a local area network (LAN), a wide area network (WAN), such as the Internet, or a combination of the three, and can include wired, wireless, or fiber optic connections. Network 110 may include one or more wired and/or wireless networks that are capable of receiving and transmitting data, voice, and/or video signals, including multimedia signals that include voice, data, and video formation. In general, network 110 may be any combination of connections and protocols that will support communications between server device 120, computing device 130, and other computing devices (not shown) within network computing environment 100.

Server device 120 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, server device 120 represents any programmable electronic devices or combination of programmable electronic devices capable of executing machine readable program instructions and communicating with other computing devices (not shown) within network computing environment 100 via a network, such as network 110.

In various embodiments of the invention, server device 120 may be a computing device that can be a standalone device, a management server, a web server, a media server, a mobile computing device, or any other programmable electronic device or computing system capable of receiving, sending, and processing data. In other embodiments, server device 120 represents a server computing system utilizing multiple computers as a server system, such as in a cloud computing environment. In an embodiment, server device 120 represents a computing system utilizing clustered computers and components (e.g., database server computers, application server computers, web servers, and media servers) that act as a single pool of seamless resources when accessed within network computing environment 100.

In various embodiments of the invention, server device 120 includes permission program 122 and information repository 124.

In an embodiment, server device 120 includes permission program 122. Embodiments of the present invention provide for a permission program 122 that determines files to monitor. In embodiments of the present invention, permission program 122 determines users to monitor/control access to files. In embodiments of the present invention, permission program 122 monitors user activities. In embodiments of the present invention, permission program 122 determines if a score event occurs. In embodiments of the present invention, permission program 122 modifies a score for a user. In embodiments of the present invention, permission program 122 alerts user(s). In embodiments of the present invention, permission program 122 receives an access request from a user for a file. In embodiments of the present invention, permission program 122 determines whether a score exceeds a threshold. In embodiments of the present invention, permission program 122 grants or denies an access request.

In an embodiment, server device 120 includes information repository 124. In an embodiment, information repository 114 may be managed by permission program 122. In an alternative embodiment, information repository 124 may be managed by the operating system of server device 120, another program (not shown), alone, or together with, permission program 122. Information repository 124 is a data repository that can store, gather, and/or analyze information. In some embodiments, information repository 124 is located externally to server device 120 and accessed through a communication network, such as network 110. In some embodiments, information repository 124 is stored on server device 120. In some embodiments, information repository 124 may reside on another computing device (not shown), provided information repository 124 is accessible by server device 120. In an embodiment, information repository 124 includes, but is not limited to, data files, data folders, data storage structures, and/or user access. In an embodiment, information repository 124 may include user profile information which may include, but is not limited to, login information, relationship information between users, all of the files that potentially can be accessed by a user, creators of a file, and creators of a folder. In an embodiment, information repository 124 may include score information which may include, but is not limited to, a score for each user for each file, a score for each user for each folder, a score for each user for each type of file (e.g., .xls, .doc, .wav, etc.). In an embodiment, information repository 124 may include access information which may include, but is not limited to number of times per time period the user views the file and number of times per time period the user edits the file. In an embodiment, the time period can be measured over any time period but specifically the time period may be an hour, a day, a week, or a year. In an embodiment, information repository 124 may include threshold information which includes, but is not limited to, threshold score for each user for each file, threshold score for each user for each folder, threshold score for a file for all users, threshold score for each folder for all users, threshold score for each user for all files, threshold score for each user for all folders, threshold score for each user for a file type, threshold score for all users for a file type, threshold score for a group of users (e.g., managers vs. non-managers, research scientists vs. marketing analysts, etc.) by file, folder or file type. In an embodiment, information repository 124 may include information for score modification including, but not limited to, how to change a score based on the score event depending on the user, the type of file, the file, or the folder of files. In an embodiment, a score value may automatically be modified and reduced if no user interaction was identified as acting on a specific resource (e.g., a file, a folder, a sub-folder).

Information repository 124 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Computing device 130 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 130 represents any programmable electronic devices or combination of programmable electronic devices capable of executing machine readable program instructions and communicating with other computing devices (not shown) within network computing environment 100 via a network, such as network 110.

In an embodiment, computing device 130 includes a user interface. A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In various embodiments of the invention, computing device 130 may be a computing device that can be a standalone device, a management server, a web server, a media server, a mobile computing device, or any other programmable electronic device or computing system capable of receiving, sending, and processing data. In other embodiments, computing device 130 represents a server computing system utilizing multiple computers as a server system, such as in a cloud computing environment. In an embodiment, computing device 130 represents a computing system utilizing clustered computers and components (e.g., database server computers, application server computers, web servers, and media servers) that act as a single pool of seamless resources when accessed within network computing environment 100.

As referred to herein, all data retrieved, collected, and used, is used in an opt in manner, i.e., the data provider has given permission for the data to be used. For example, a user that is attempting to access a file using permission program 122 will have opted into collection of their data.

Figure 2:
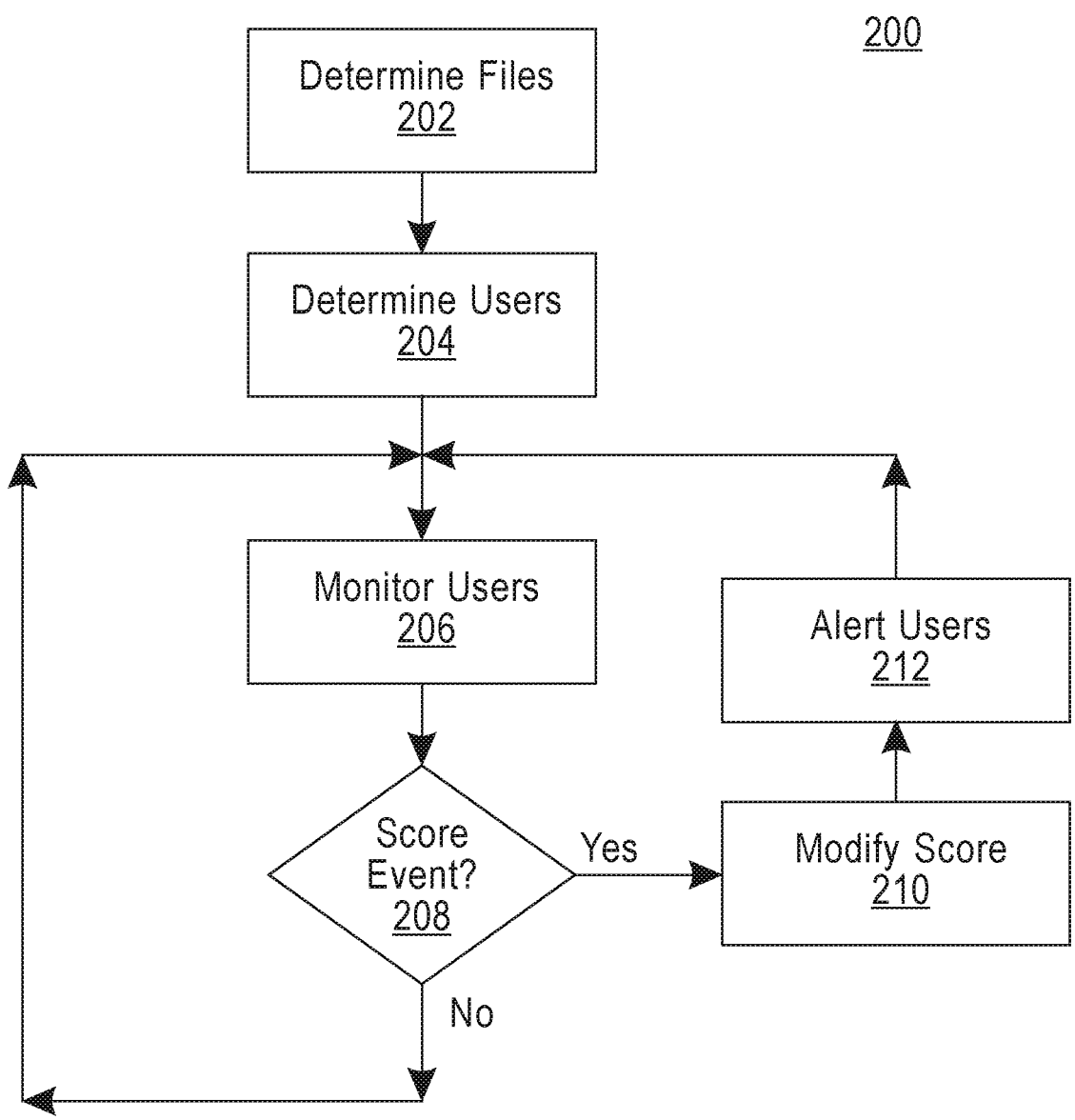
FIG. 2 is a flow chart diagram depicting operational steps for permission program 122, generally designated 200, in accordance with at least one embodiment of the invention.

FIG. 2 is a flow chart diagram of workflow 200 depicting operational steps for permission program 122 in accordance with at least one embodiment of the invention. In an alternative embodiment, the steps of workflow 200 may be performed by any other program while working with permission program 122. It should be appreciated that embodiments of the present invention provide at least for allowing access to data based at on a score for a user for a file being compared to a threshold. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface, can invoke workflow 200 upon a user wanting to access a file that permission program 122 has control of.

Permission program 122 determines files (step 202). At step 202, permission program 122 receives information about one or more files or one or more folders containing any number of files that will have access controlled by permission program 122. In an embodiment, permission program 122 receives the information about the files from one or more users (e.g., administrator, IT support, data creator, etc.). In an embodiment, permission program 122 may receive threshold information for each of the files. In an embodiment, the threshold information may be for all users for each file, for each individual user for each file, for all users for each file type, for each individual user for each file type, for all users for a folder, for each individual user for each folder.

Permission program 122 determines users (step 204). At step 204, permission program 122 determines users that will have their access monitored/controlled for the determined files. In an embodiment, permission program 122 receives the information about the files from one or more other users (e.g., administrator, IT support, data creator, etc.). At step 204, permission program 122 may receive login information about each user. In an embodiment, permission program 122 receives login information in the form of a user identification and an associated password. In an embodiment, the user identification may be a username, a ClientID, login credentials, or any other form of identification that identifies the user. In an embodiment, each set of login information is associated exclusively with a single user. In an embodiment, permission program 122 may receive a starting score for each user for each file, folder, and/or file type. In an embodiment, permission program 122 may receive a current score for each user for each file, folder, and/or file type. In an embodiment, a score is a numeric value that can be within a range. For example, a score may be a seven in a range of zero through ten (the higher the score, the higher the level of confidence that the user can access the resource). In another example, a score may be a fifty-five in a range of zero through one hundred.

Permission program 122 monitors users (step 206). At step 206, permission program 122 monitors the users and their actions with the files. In other words, permission program 122 has granted access to the user for a file and the user is performing an action on the file. In an embodiment, an action can be viewing the content of a file or editing a file. In another embodiment, an action can be the deletion of a file, copying the file, or moving the file to a different directory. In another embodiment, an action can be downloading the file, or sharing the file with other users. In another embodiment, an action can be viewing the file name, size, and date, without directly interacting with the file. In another embodiment, an action can be viewing statistical information related to the file (e.g., which other users acted on the file). In an embodiment, permission program 122 will keep a running total of the amount of actions that occur for a user for a file.

Permission program 122 determines if a score event has occurred (decision step 208). At decision step 208, permission program 122 determines if a user has performed an action that will modify a score for a file, folder, etc. associated with the user. In an alternative embodiment, permission program 122 uses the information received from monitoring a user to determine if a scoring event has occurred. In an embodiment, a scoring event may be a user accessing or editing a file. In an alternative embodiment, a scoring event may be a user accessing or editing a file above or below a threshold number of times in a time period. In an embodiment, a scoring event may be performing any of the actions found in step 206 a threshold number of times in a time period. For example, a scoring event may occur if a user accesses a file more than three times in a twenty-four-hour period. In another example, a scoring event may occur if a user edits a file more than twice in a week. In yet another example, a scoring event may occur if a user does not access a file at least once in a three-day period. In an embodiment, if a score event has not occurred (decision step 208, no branch) processing proceeds to monitors the users (step 206). In an embodiment, if a score event has occurred (decision step 208, yes branch) processing proceeds to modify the score (step 210).

Permission program 122 modifies a score (step 210). At step 210, permission program 122 modifies a score for a file, folder, or file type based on the score event in decision step 208. In an embodiment, permission program 122 may modify the score to increase the score (e.g., from a six to a seven). In an alternative embodiment, permission program may modify the score to decrease the score (e.g. from a seven to a six). In an embodiment, the increment for increasing or decreasing the score may be a single score increment (e.g., a score increment of zero for a range of zero through ten), a group of scoring increment (e.g., a score increment of seven for a range of zero through one hundred), and/or a percentage of scoring increment (e.g., a score increment of ten percent of the total value of the score range). For example, if a user accesses a file more than three times in a week, then permission program 122 will increase the score for the user for that file by a set amount. In this example, permission program 122 will increase the score by one score increment (e.g., from six to seven). In another example, if a user does not edit a file in a folder at least once a week, then permission program 122 will decrease the score by one score increment (e.g., from seven to six) for each file in that folder and/or for the folder. In yet another example, if a user does not access a specific file type (e.g., .xls files), then permission program 122 will decrease all .xls files associated with the user by 10% of their score range value (e.g., a score range of zero to one hundred will decrease by ten). In an embodiment, permission program 122 may determine the types of files that the user has a score changing event for. In other words, permission program 122 may determine that there is a score event that causes a score modification for a document related to software quality. In this embodiment, permission program 122 may also modify the score similarly for all other documents related to software quality for that user. In an embodiment, score modification may vary depending on the user. In other words, a score event for User A (e.g., a computer programmer) that causes a score modification (e.g., decrease from eight to five for the file for User A) may have an identical score event for User B (e.g., a CEO of a company), however, User B may have a smaller score modification (e.g., decrease from eight to seven for the file). In this embodiment, score modifications determined by the rules in information repository 124.

Permission program 122 alerts users (step 212). At step 212, permission program 122 alerts user of scores. In an embodiment, permission program 122 alerts a user that has their score modified of the modification. In an alternative embodiment, permission program 122 alerts a user that has their score modified if the new modified score is below a threshold. In this embodiment, the threshold is not necessarily the threshold score for accessing the file but may be. In yet another embodiment, permission program 122 alerts another user not associated with the file if the score for the file has dropped below a threshold score. In this embodiment, the threshold is not necessarily the threshold score for accessing the file but may be. For example, permission program 122 may alert users (e.g., administrator, IT support, data creator, etc.) in scenarios where a score has dropped due to a user leaving the company, etc.

Figure 3:
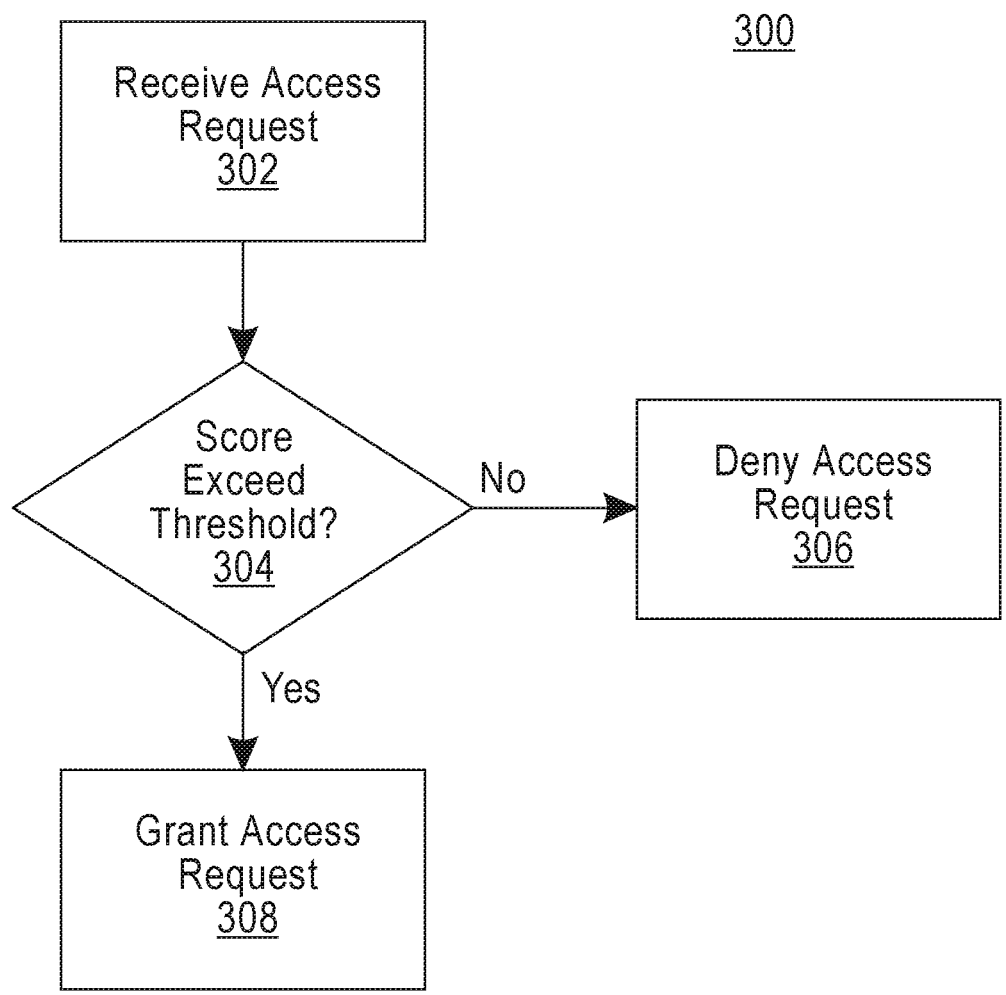
FIG. 3 is a flow chart diagram depicting operational steps for permission program 122, generally designated 300, in accordance with at least one embodiment of the invention.

FIG. 3 is a flow chart diagram of workflow 300 depicting operational steps for permission program 122 in accordance with at least one embodiment of the invention. In an alternative embodiment, the steps of workflow 300 may be performed by any other program while working with permission program 122. It should be appreciated that embodiments of the present invention provide at least for allowing access to data based at on a score for a user for a file being compared to a threshold. FIG. 3, however, provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface, can invoke workflow 200 upon a user wanting to access a file that permission program 122 has control of.

Permission program 122 receives access request (step 302). At step 302, permission program 122 receives an access request to a file or folder form a user. In an embodiment, permission program 122 receives a specific file that the user would like to access. In an alternative embodiment, permission program 122 receives a group of files such as a folder of files that that the user would like to access.

In an embodiment, in step 302, permission program 122 may verify the login information that is received with the file or folder access request. In an embodiment, permission program 122 compares the login information received to the login information found in the user profile information in information repository 124. If the login information is incorrect, in other words the login information does not match the login information found in information repository 124, permission program 122 notifies the user of the incorrect login information and processing of flow 300 ends. In this embodiment, the user may input login information again. If the login information is correct, permission program 122 may notify the user via the user interface on the client device of the correct login information.

Permission program 122 determines if the score exceeds a threshold (decision step 304). At step 304, permission program 122 determines if a score for the file the user is requesting exceeds the access threshold. In an embodiment, permission program 122 access information repository 124 and determines the score for the file for the user and the threshold for the file for the user. In other words, permission program 122 determines the score for the user for the file and then permission program 122 compares the score to the threshold score for access. In an example, permission program 122 determines the score for the file for the user is a seven and permission program 122 compares the seven to the threshold score for access which is a six. In another example, the threshold score for access may be for all file types the user is trying to access. In an embodiment, if a score does not exceed the threshold (decision step 304, no branch) processing proceeds to deny access request (step 306). In an embodiment, if a score if a score does exceed the threshold (decision step 304, yes branch) processing proceeds to grant access request (step 308).

Permission program 122 denies access request (step 306). At step 306, permission program 122 notifies the user that their access request is denied. In other words, permission program 122 does not allow the user to access the file that was requested. In an embodiment, permission program 122 may notify other users (e.g., administrator, IT support, data creator, etc.) of the denied access request. In this embodiment, the notification of other users may occur if the denied access request occurs a specified number of times (e.g., denied access request times more than a threshold).

Permission program 122 grants access request (step 308). At step 308, permission program 122 notifies the user that their access request is granted. In other words, permission program 122 allows the user to access the file that was request. In an embodiment, permission program 122 allows the user to access the file for a certain number of times (e.g., the user can access the file three times before a new access request is required) or for a certain period of time (e.g., the user can access the file for one hour before a new access request is required). In one embodiment, the permission program 122 is configured to provide notifications (e.g., to the user's manager, an administrator) on the grant request.

Figure 4:
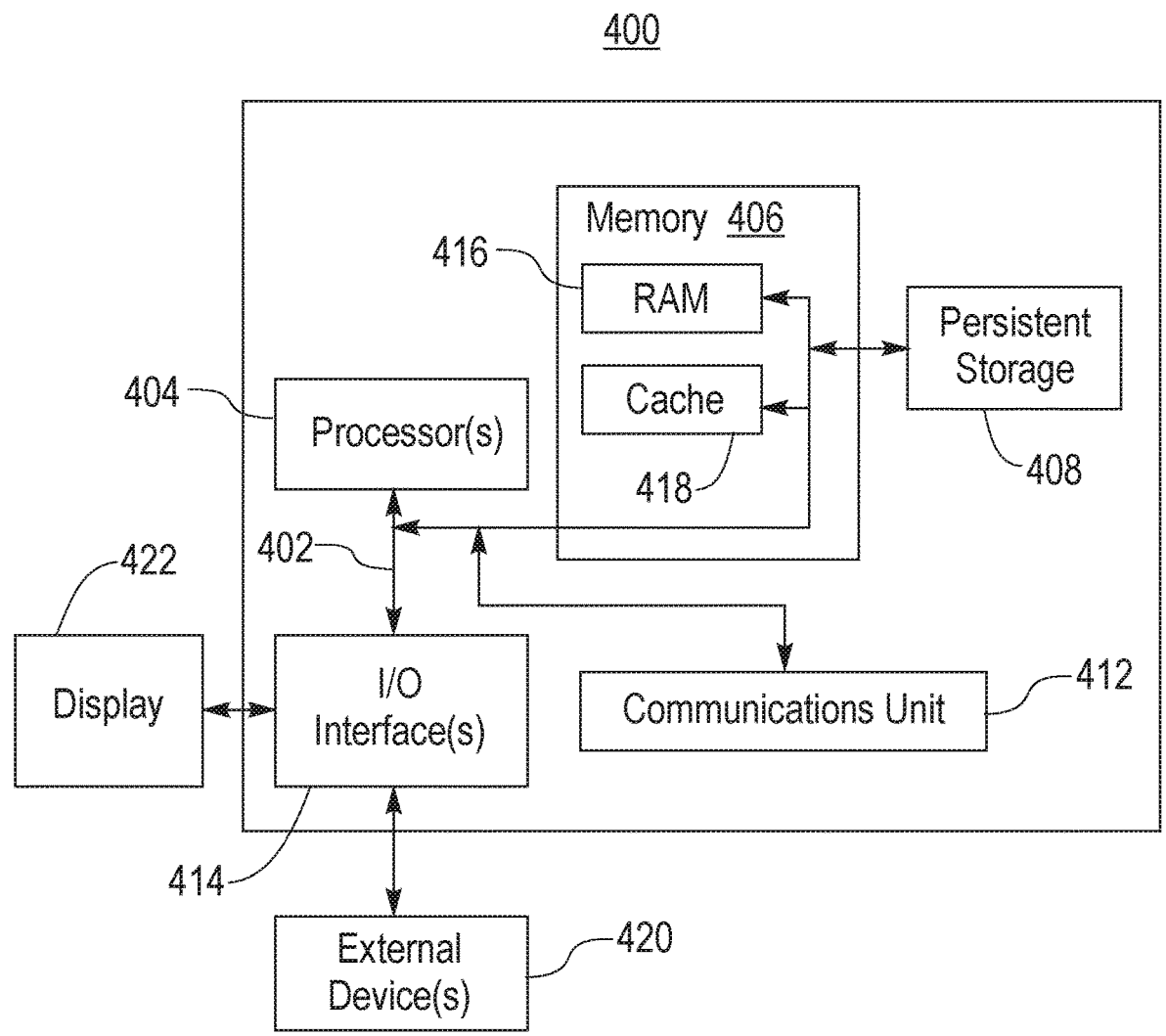
FIG. 4 is a block diagram depicting components of a computer, generally designated 400, suitable for executing permission program 122, in accordance with at least one embodiment of the invention.

FIG. 4 is a block diagram depicting components of a computer 400 suitable for permission program 122, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with an architecture suitable for passing data or control information between the processors

404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random-access memory (RAM) 416 and a cache 418. In general, the memory 406 may comprise any suitable volatile or non-volatile one or more computer readable storage media.

Program instructions permission program 122 may be stored in the persistent storage 408, or more generally, any computer readable storage media, for execution by one or more of the respective computer processors 404 via one or more memories of the memory 406. The persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for data access, the computer-implemented method comprising the steps of:
    determining, by one or more computer processors, one or more files, wherein each file of the one or more files has a score threshold for access;
    determining, by one or more computer processors, one or more users, wherein each user of the one or more users has a score for each file of the one or more files;
    receiving, by one or more computer processors, a request from a user of the one or more users, wherein the request is for the user to access a file of the one or more files; and
    comparing, by one or more computer processors, the score for the file for the user to the score threshold for access for the file.

2. The computer-implemented method of claim 1, further comprising:
    responsive to the score for the file for the user exceeding the score threshold for access for the file, granting, by one or more computer processors, the request.

3. The computer-implemented method of claim 1, further comprising:
    responsive to the score threshold for access for the file exceeding the score for the file for the user, denying, by one or more computer processors, the request.

4. The computer-implemented method of claim 3, further comprising:
    notifying, by one or more computer processors, a second user of the denied access request, wherein the second user is an administrator, information technology (IT) support, or data creator of the file.

5. The computer-implemented method of claim 1, further comprising:
    modifying, by one or more computer processors, a score of any of the one or more files based on a score event, wherein a score event is an action occurring over an action threshold number of times within a time period.

6. The computer implemented method of claim 5, wherein the action is selected from the group consisting of viewing the content of the file and editing the file.

7. The computer implemented method of claim 5, wherein the action is selected from the group consisting of downloading the file, moving the file to a different direction, sharing the file with other users, viewing the file name, size, or date without directly interacting with the file, or viewing statistical information related to the file.

8. A computer program product for data access, the computer program product comprising:
    one or more computer readable storage media; and
    program instructions stored on the one or more computer readable storage media, the program instructions comprising:
        program instructions to determine one or more files, wherein each file of the one or more files has a score threshold for access;
        program instructions to determine one or more users, wherein each user of the one or more users has a score for each file of the one or more files;
        program instructions to receive a request from a user of the one or more users, wherein the request is for the user to access a file of the one or more files; and
        program instructions to compare the score for the file for the user to the score threshold for access for the file.

9. The computer program product of claim 8, further comprising program instructions, stored on the one or more computer readable storage media, to:

responsive to the score for the file for the user exceeding the score threshold for access for the file, grant the request.

10. The computer program product of claim 8, further comprising program instructions, stored on the one or more computer readable storage media, to:
responsive to the score threshold for access for the file exceeding the score for the file for the user, deny the request.

11. The computer program product of claim 10, further comprising program instructions, stored on the one or more computer readable storage media, to:
notify a second user of the denied access request, wherein the second user is an administrator, information technology (IT) support, or data creator of the file.

12. The computer program product of claim 8, further comprising program instructions, stored on the one or more computer readable storage media, to:
modify a score of any of the one or more files based on a score event, wherein a score event is an action occurring over an action threshold number of times within a time period.

13. The computer program product of claim 12, wherein the action is selected from the group consisting of viewing the content of a file and editing a file.

14. The computer program product of claim 12, wherein the action is selected from the group consisting of downloading the file, moving the file to a different direction, sharing the file with other users, viewing the file name, size, or date without directly interacting with the file, or viewing statistical information related to the file.

15. A computer system for data access, the computer system comprising:
one or more computer processors;
one or more computer readable storage media; and
program instructions, stored on the one or more computer readable storage media for execution by at least one of the one or more computer processors, the program instructions comprising:
program instructions to determine one or more files, wherein each file of the one or more files has a score threshold for access;
program instructions to determine one or more users, wherein each user of the one or more users has a score for each file of the one or more files;
program instructions to receive a request from a user of the one or more users, wherein the request is for the user to access a file of the one or more files; and
program instructions to compare the score for the file for the user to the score threshold for access for the file.

16. The computer system of claim 15, further comprising program instructions, stored on the one or more computer readable storage media for execution by at least one of the one or more computer processors, to:
responsive to the score for the file for the user exceeding the score threshold for access for the file, grant the request.

17. The computer system of claim 15, further comprising program instructions, stored on the one or more computer readable storage media for execution by at least one of the one or more computer processors, to:
responsive to the score threshold for access for the file exceeding the score for the file for the user, deny the request.

18. The computer system of claim 17, further comprising program instructions, stored on the one or more computer readable storage media for execution by at least one of the one or more computer processors, to:
notify a second user of the denied access request, wherein the second user is an administrator, information technology (IT) support, or data creator of the file.

19. The computer system of claim 15, further comprising program instructions, stored on the one or more computer readable storage media for execution by at least one of the one or more computer processors, to:
modify a score of any of the one or more files based on a score event, wherein a score event is an action occurring over an action threshold number of times within a time period.

20. The computer system of claim 19, wherein the action is selected from the group consisting of viewing the content of the file, editing the file, downloading the file, moving the file to a different direction, sharing the file with other users, viewing the file name, size, or date without directly interacting with the file, or viewing statistical information related to the file.

* * * * *